US008215565B2

(12) United States Patent
Howard

(10) Patent No.: US 8,215,565 B2
(45) Date of Patent: Jul. 10, 2012

(54) APPARATUS AND METHOD FOR SECUREMENT OF TWO-DIMENSIONAL BAR CODES WITH GEOMETRIC SYMBOLOGY

(76) Inventor: Christopher Brett Howard, Provo, UT (US)

( * ) Notice: Subject to any disclaimer, the term of this patent is extended or adjusted under 35 U.S.C. 154(b) by 216 days.

(21) Appl. No.: 12/748,450

(22) Filed: Mar. 28, 2010

(65) Prior Publication Data

US 2011/0233284 A1    Sep. 29, 2011

(51) Int. Cl.
*G06K 19/06*    (2006.01)
(52) U.S. Cl. .......................... 235/494; 235/454
(58) Field of Classification Search ............... 235/494, 235/454, 462.03, 462.04; 382/233, 232
See application file for complete search history.

(56) References Cited

U.S. PATENT DOCUMENTS

| 2007/0187208 A1* | 8/2007 | Tsai ............................... 194/205 |
| 2007/0278316 A1* | 12/2007 | Hovis ............................ 235/494 |
| 2009/0244656 A1* | 10/2009 | Takahashi et al. ............. 358/474 |
| 2010/0246984 A1* | 9/2010 | Cheong et al. ................ 382/233 |

FOREIGN PATENT DOCUMENTS

WO    WO 2007055492 A1 *    5/2007

* cited by examiner

*Primary Examiner* — Edwyn Labaze
(74) *Attorney, Agent, or Firm* — Steven Rinehart

(57) ABSTRACT

An apparatus and method are disclosed for tamper-proofing two-dimensional, optical, computer readable bar codes, including QR Codes. QR Codes, like traditional bar codes, contain computer readable content not cognizable by the human mind. The present invention teaches means of securing this content from would-be thieves and forgers motivated to overlay authorized, original content with unauthorized, replacement content.

18 Claims, 6 Drawing Sheets

APPARATUS AND METHOD FOR SECUREMENT OF TWO-DIMENSIONAL BAR CODES WITH GEOMETRIC SYMBOLOGY

BACKGROUND OF THE INVENTION

1. Field of the Invention

This invention relates to bar codes, and more particularly relates to a tamper-proof apparatus for securing bar codes from unauthorized replacement with geometric patterns.

2. Description of the Related Art

Two-dimensional, optical, computer readable bar codes, including Quick Response (QR) Codes, are well-known in the art. QR Codes, like traditional bar codes, contain nonvolatile, computer readable, content not cognizable by the human mind. In particular, QR Codes contain hardlinks meant to direct a computer to Internet Uniform Resource Locators (URLs) resolving to websites with information associated with the physical objects to which the QR Codes are affixed. While human beings can visually identify a QR Code generally, humans cannot recognize the specific content printed within QR Codes and other bar codes. Because the content of QR Codes is printed and intended for optical computer recognition, rather than human recognition, humans cannot distinguish legitimate original QR Code content from replacement illegitimate content overlaying the original content. This inability of humans to recognize illegitimate content creates an opportunity for pornographers, thieves, competitors, and other opportunists to misappropriate legitimate QR Codes for their own benefit by overlaying their content on original content, and thus redirecting humans and computers optically scanning to replacement content to unauthorized URLs.

The present invention teaches means of using color-coded and textured geometric patterns to secure legitimate content from would-be thieves and forgers bent on beguiling computers and human observers, and through such means imparts to human observers the ability to distinguish legitimate content from illegitimate.

SUMMARY OF THE INVENTION

From the foregoing discussion, it should be apparent that a need exists for an apparatus and method to secure two-dimensional bar codes from unauthorized tampering. Beneficially, such an apparatus, system, and method would overcome the many of the difficulties with prior art by providing a means for humans to distinguish legitimate bar code content from illegitimate bar code content using recognizable geometric patterns.

The present invention has been developed in response to the present state of the art, and in particular, in response to the problems and needs in the art that have not yet been fully solved by currently available technologies. Accordingly, the present invention has been developed to provide an apparatus and method for securing a two-dimensional bar code, the security badge comprising a printed QR Code encircled by a plurality of color-coded rings, wherein each color-coded ring represents a predefined category selected from the group consisting of: a category representative of subject matter displayed on a website to which a URL referenced in the QR Code resolves, and a category representative of a Trademark class established by the United States Trademark Office.

One or more of the color-coded rings may overlap the QR Code. One or more of the color-coded rings may underlap the QR Code. One or more color-coded rings may comprise rigid three-dimensional rings affixed to the security badge and overlaying the QR Code. A color of an area encircled by the one or more color-coded rings may be representative of a predefined category not represented by the one or more color-coded rings.

The area encircled by the one or more color-coded rings may be partially overlaid with the QR Code, in some embodiments. One or more color-coded circles may overlap and underlap one another.

One or more color-coded circles may comprise non-uniform radii. In some embodiments, one or more color-coded circles may comprise non-uniformly located centers within the QR Code.

In other embodiments, the area encircled by the one or more color-coded rings is overlaid with the QR Code. Additionally, the one or more color-coded rings may be textured. In some embodiments, the texture comprises Braille identifying the predefined category, or informing a blind human being that audio will be played via a website if the blind human being scans the security badge. In other embodiments, the one or more color-coded rings are chemiluminescent.

In some embodiments, the QR Code comprises between one and four non-linear border edges, the non-linear border edges representative of one of: a date upon which the QR Code was printed, a location where the QR Code was printed, a target audience, and effectiveness estimate.

The security badge may further comprise a plurality of printed stripes underlaying the QR Code and the one or more color-coded rings, wherein each of the printed stripes is representative of secondary category selected from the group consisting of: a category representative of subject matter displayed on a website to which a URL referenced in the QR Code resolves, and a category representative of a Trademark class established by the United States Trademark Office, a category representative of type of real estate offering, and category representative of a price range, a category representative of the age range for which the website is intended, and a category representative of geographic location.

The security badge may further comprise a passive RFID tag for demodulating a radio-frequency signal, the RFID tag identifying the owner of the QR Code. In alternative embodiments, the QR Code recited in each of the above embodiments is substituted for another two-dimensional bar code.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
FIG. 1 illustrates a QR Code taught by prior art.

Many of the functional units described in this specification could be labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a QR Code 102 taught by prior art. The QR Code 102 comprises a two-dimensional bar code recognizable by digital cameras and executable computer programs in logical communication with an optical scanner. QR Codes 102 are well-known to those of skill in the art. QR Codes 102 comprise oversampled polynomial source code in the form of a data matrix which hardlink the QR Code 102 and/or object to which the QR Code is affixed to either a Uniform Resource Locator (URL), Uniform Resource Name (URN), or Uniform Resource Identifier (URI) on the Internet when evaluated.

QR Codes 102 use Reed-Solomon error correction to embody accurately evaluable hardlinks to predetermined URLs. When the QR Code 102 is photographed and/or scanned by an executable computer program, a human being is directed to a URL resolving to a website with information sought by the human in scanning the QR Code 102.

Figure 2:
FIG. 2 is a first embodiment of security badge for securing a QR code with geometric symbology in accordance with the present invention.

FIG. 2 is a first embodiment of security badge 200 for securing a QR code with geometric symbology in accordance with the present invention. The security badge 200 comprises a QR Code 102, an outer ring 202, a center ring 204, an inner ring 206, a badge background 208, and a code border 210.

The security badge 200 is useful is a useful improvement to signage bearing one or more two-dimensional matrix bar codes, such as QR Codes 107, which are publicly displayed. The QR Code 102 is substantially described above in relation to FIG. 1 and is well-known to those of skill in the art. The QR Code 102 in the present invention may comprise Aztec Codes, barcodes, ShotCodes, touchtags, and the like.

The QR Code 102 is encircled by a plurality of rings 202, 204, 206. In the shown embodiment, the QR Code 102 is encircled by three rings, an outer ring 202, a center ring 204, and an inner ring 206 (the "rings").

In the shown embodiment, each of the rings 202, 204, 208 comprise two-dimensional objects printed on the security badge 200. In other embodiments, the rings 202, 204, 206 may comprise three-dimensional solid or hollow tubular objects which encircle and/or inscribe the QR Code 102. Three-dimensional rings 202, 204, 206 may be formed from materials well-known to those of skill in the art, including polymers, common metals, woods, glass, precious metals, crystal, and the like.

The rings 202, 204, 206 alternatively underlay and overlay the QR Code 102. In this configuration, the QR Code 102 is protected from alteration, tampering, or addition of illegitimate content. Traditional QR Codes 102 can be overlaid with stickers comprising illegitimate QR Codes 102 that redirect data processing devices scanning them to non-authorized websites, exemplia gratia pornographic websites, competitors' websites, cloned websites, and other websites not authorized by the entity producing and/or maintaining the legitimate QR Code 102. Because human beings cannot distinguish between a legitimate and illegitimate QR Code 102, traditional QR Codes 102 are easily altered or tampered with to mislead human observers.

The present invention teaches, inter alia, means of using geometric shapes, such as the rings 202, 204, 206, to impart to human observers the ability to tell whether a QR Code 102 has been tampered with. The ability to visually distinguishing legitimate, original, bar code content from illegitimate, non-original, unauthorized content is facilitated by the teaching of the present invention. The present invention teaches means of tamper-proofing QR Codes and other bar codes known in the art.

The rings 202, 204, 206 are color-coded, in the shown embodiment, in accordance with a predetermined color criteria in which the color of each ring is representative of the type of content displayed by the website to which the hardlink coded in the QR Code 102 resolves (the "website"). In some embodiments, the ring colors are representative of the age range of target consumers for whom the website is intended (e.g. adult, teen, preteen, etc). In other embodiments, the ring colors are representative of the class of commerce in which the business or entity maintaining the QR Code 102 is engaged, such as a Trademark class established by the United States Trademark Office (USPTO). In still further embodiments, the ring colors are representative of the type of entity managing the QR Code 102 (e.g. nonprofit organization, university, s-corporation, c-corporation, political action committee, military or government agency, municipality, limited liability company, partnership, and the like); the ethnicity, age, sex, size, sexual orientation, or religion of the owners and/or managers of the QR Code 102 or associated business; or an organization affiliated with the owners such as a union or guild; etcetera.

In embodiments of the present invention in which the color of the rings 202, 204, 206 is representative of the age range of consumers, or target audience, for whom the website is intended, the computer application scanning the security badge 200 may be configured to restrict access to the website in response to scanning a particular ring color pre-associated with adult content. In other embodiments of the present invention, the computer program product scanning, or recognizing, the security badge 200 may be configured to restrict access to certain websites or content for which the human operator of the computer program product has not paid to access.

The colors of the rings 202, 204, 206 may be chemiluminescent to make them visible at night to human observers passing by in poorly lit areas. Alternatively, they may be lit, backlit, or otherwise illuminated using power supplies and electrical components well-known to those of skill in the art.

In some embodiments of the present invention, the QR Code 102 itself has three-dimensional properties. In some embodiments, the data matrix of the QR Code 102 may be embossed, raised, repousséed, chased, etcetera. In some embodiments, the QR Code 102 and/or entire security badge 200 is overlaid with glass or another rigid, transparent material. In some embodiments, the security badge 200 is projected by a projector onto colored surfaces, or curved surfaces, for mass display to large crowds. In other embodiments of the present invention, the security badge 200 comprises a passive or active radio-frequency identification (RFID) tag.

The badge background 208, like the rings 202, 204, 206, is color-coded to convey information to a human observer, and/or data processing device scanning the security badge 200, about the website and/or entity managing the security badge 200. In some embodiments, the badge background 208 is textured, transparent, florescent, chemiluminescent, and the like. The badge background 208 may signify the date when the security badge 208 was printed, a price point of a product associated with the security badge 200, a type of merchant (e.g. a restaurant, or type of restaurant), a type of information provided by an organization affiliated with the security badge 200 (e.g. customer service, 411 information, etc.), and the like. In other embodiments, the rings 202, 204, 206 may carry the same or alternate significance as the badge background 208.

The code border 210 denotes the borders of the QR Code 102. In many embodiments of the present invention, the QR Code 102 is square. In other embodiments, the QR Code 102 is circular, rectangular, triangular, or rhombus-shaped. The code border 210 comprises the edges of the QR Code 102, irrespective of the shape embodying the QR Code 102.

In the shown embodiment, the QR Code 102 is square. The code border 210 comprises linear edges. In some embodiments of the present invention, the code border 210 comprises dashed edges, dotted edges, wavy edges, beveled edges, gradient edges, shaky edges, smooth edges, squiggly edges, and the like. In certain embodiments of the present invention, technical meaning is pre-associated with the shape of the code border 210. For instance, a wavy code border 210 may be universally indicative to observers of the security badge 200 of use of semi-conductor technology by the authority managing or associated with the security badge 200, or of use of radio frequency technologies, imported goods, consumables, kitchenware, and the like.

In some embodiments, the code border 210 may signify an efficiency estimate, or an estimate of traffic to a website which the security badge 200 is expected to generate. For instance, a jagged code border 210 may signify estimated traffic of 1,000 to 10,000 unique monthly hits, while a dashed edge may signify estimated traffic of more than 100,000 unique hits each month, etcetera. In alternative embodiments, the code border 210 signifies a range of historical traffic figures to a website, rather than a prediction of future traffic.

In some embodiments of the present invention, the security badge 200 is placed on top of preprinted signage using decals, stickers, and the like. In some embodiments of the present invention, the security badge is semi-transparent, and can be placed over car windows or pre-printed matter such that printing underlying the security badge 200 is still visible, but not to such a degree as to impracticate optical recognition of the QR Code 102 by a scanner and/or computer program product seeking to optically recognize the QR Code 102.

Figure 3:
FIG. 3 is a second embodiment of security badge for securing a QR code with geometric symbology in accordance with the present invention.

FIG. 3 is another embodiment of a security badge 300 for securing a QR code with geometric symbology in accordance with the present invention. The security badge 300 comprises a QR Code 102, an outer ring 202, a center ring 204, an inner ring 206, a badge background 208, a code border 210, color code 302, code background 304, and an overlapping ring 306.

Each of the QR Code 102, outer ring 202, center ring 204, inner ring 206, badge background 208, and code border 210 are substantially described above in relation to FIGS. 1-2.

The code color 302 comprises the color of the source code in the QR Code 102, which is in this embodiment black. The code color 302 may comprise any color well-known to human observers (e.g. red, blue, black, white, brown, yellow, transparent, green, gray, etc.).

The code background 304 comprises the background color of the QR Code 102, which is in this embodiment white. The background color 304 may comprise any color well-known to human observers (e.g. red, blue, black, white, brown, yellow, green, gray, etc.). In some embodiments of the present invention, the code background 304 and the code color 302 are congruent, and the source code of the QR Code 102 is distinguished from the code background 304 only by non-visual characteristics inherent in the code background 304 and/or the code color 302, such as chemiluminescence, ferromagnetism, density, finish, texture, etcetera.

The overlapping ring 306 (like the rings 202, 204, 206) is color-coded and symbolic of some characteristic of the website content and/or entity managing the security badge 300. Were an illegitimate bar code to be placed over the QR Code 102, it would lack the markings and color of the overlapping ring 306 and be visually distinguishable from the original QR Code 102.

In the shown embodiment, the overlapping ring 306 touches each of three squares shown in the data matrix of the QR Code 102. In the shown embodiment of the present invention, the inner most ring 202, 204, 206, 306 proximates the three squares in the QR Code 102 data matrix so closely that the QR Code 102 could not be reliably scanned if the inner most ring 202, 204, 206, 306 were closer to the data matrix.

The rings 202, 204, 206, 306 may, in some embodiments, comprise incongruent radii and incongruently located center points. The center points of each of the rings 202, 204, 206, 306 may be located within the QR Code 102, or outside the QR Code 102.

In some embodiments, the rings 202, 204, 206, 306 are not circular, but rather comprise other combinations of regular and irregular geometric shapes, such as triangular, rectangular, elliptical, pentagonal, pentagramal, and the like. In some embodiments of the present invention, the shape of each of the rings 202, 204, 206, 306 is further representative of some characteristic of the website or products associated therewith.

Figure 4:
FIG. 4 is a third embodiment of security badge for securing a QR code with geometric symbology in accordance with the present invention.

FIG. 4 is another embodiment of security badge 400 for securing a QR code with geometric symbology in accordance with the present invention. The security badge 400 comprises a QR Code 102, a badge background 208, and an overlapping ring 306.

Each of the QR Code 102, the outer ring 202, the badge background 208, and an overlapping ring 306 are substantially described above in relation to FIGS. 1-3.

The security badge 400 may comprise more than one QR Code 102 and/or bar code in non-shown embodiments.

Figure 5:
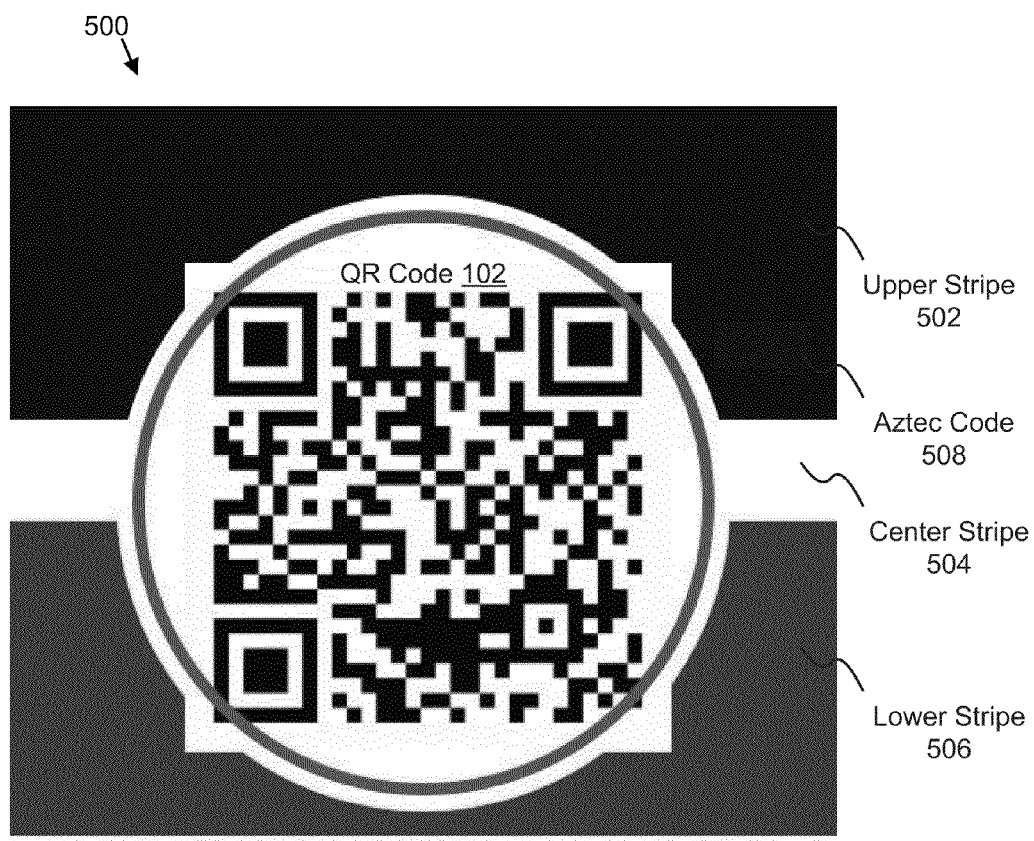
FIG. 5 is a fourth embodiment of security badge for securing a QR code with geometric symbology in accordance with the present invention.

FIG. 5 is another embodiment of security badge 500 for securing of a QR code with geometric symbology in accordance with the present invention. The security badge 500 comprises a QR Code 102, an upper stripe 502, a center stripe 504, a lower stripe 506, and an Aztec code 508.

The stripes 502, 504, 506 each underlay the QR Code 102. In some embodiments of the present invention, the security badge 500 comprises from one to five hundred stripes directionally situated behind the QR Code 102. In some embodiments, the stripes 502, 504, 506 are situated horizontally. In some embodiments, the stripes 502, 504, 506 are situated vertically. In some embodiments, the stripes 502, 504, 506 are situated diagonally. In some embodiments, the stripes 502, 504, 506 are situated orthogonally.

Like the rings 202, 204, 206, 306, the stripe colors are representative of one of a category of subject matter displayed on a website to which a URL referenced in the QR Code resolves, a category representative of a Trademark class established by the United States Trademark Office, a category representative of type of real estate offering, and category representative of a price range, a category representative of the age range for which the website is intended, and a category representative of geographic location.

In some embodiments, the color of the upper stripe 502 may be indicative of the state or city in which the business managing the QR Code 102 is situated, or indicative of the state or city in which the product marketed by the business is situated (e.g. real estate, buildings, equipment, factories, and the like).

In alternate embodiments of the present invention, the combination of stripe colors may be indicative of an exclusive license to use said combination granted by an organization with rights over the security badge 400. For instance, the organization with rights over the security badge 400 may grant unto one merchant using the security badge 400 the exclusive rights to use and identify itself with the stripe colors black and blue.

The security badge 500 may additionally or alternatively comprise other two dimensional bar codes, such as the Aztec code 508 and/or other well-known to those of skill in the art. The security badge may comprise holographs, or lenticular prints, in whole or in part, such that the rings 202, 204, 206, 306 and/or the stripes 502, 504, 506 and/or the QR Code 102 are printed lenticularly.

The security badge may further comprise a passive RFID tag for demodulating a radio-frequency signal, the RFID tag identifying the owner of the QR Code. In alternative embodiments.

One purpose of the stripes 502, 504, 506 is to provide human observers of the security badge 200 and QR Code 102 with means of visually distinguishing legitimate QR Code 102 content from illegitimate and of providing human observers with information about the website before the QR Code 102 is scanned.

Figure 6:
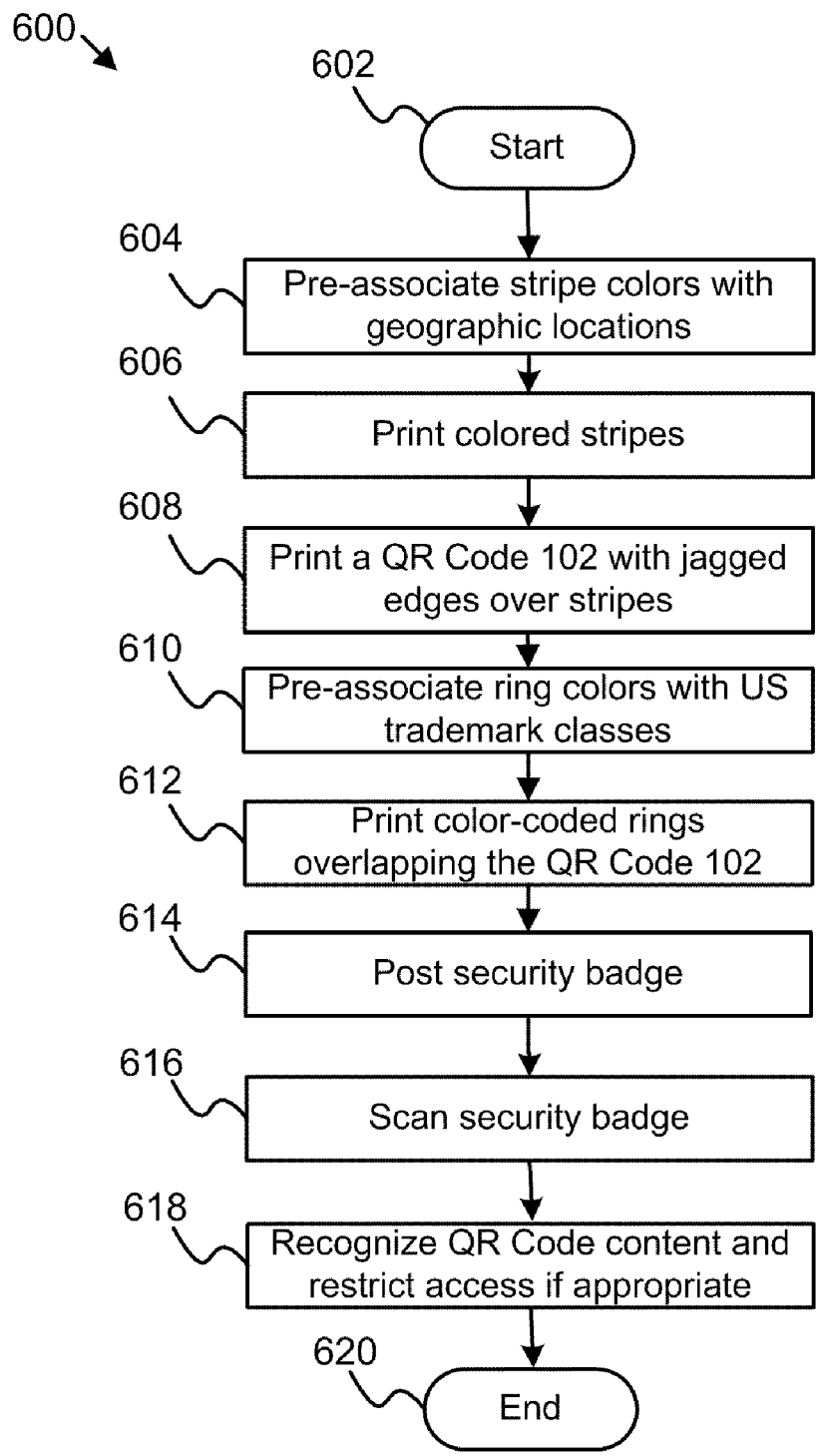
FIG. 6 is a schematic flow chart diagram illustrating one embodiment of a method for securing a two-dimensional bar code with geometric symbology in accordance with the present invention.

FIG. 6 is a schematic flow chart diagram illustrating one embodiment of a method 600 for securing a two-dimensional bar code with geometric symbology in accordance with the present invention.

The method 600 begins 602 and a managing entity pre-associates 604 stripe 502, 504, 506 colors with geographic locations, such as states, cities or countries.

The method 600 proceeds by printing 606 QR Codes 102 over the stripes 502, 504, 506. The QR Code 102 comprises jagged lines indicative of a company dealing with power generation.

The method proceeds by pre-associating 610 ring colors with trademark classes recognized by the USPTO.

Rings 202, 204, 206, 306 are printed 612 over the QR Code 102 such that the rings overlap the QR Code 102. One of the overlapping stripes is green, indicating the company managing the security badge develops alternative energies.

Proceeding, the security badge comprising the QR Code 102, the rings 202, 204, 206, 306 and stripes 502, 504, 506 is posted 614. In some embodiments of the present invention, the method 600 progresses when the optical scanner scans 616 the security badge and recognizes 618 symbology in the security badge associated with content regulated or restricted on the website, such as adult content. The computer program product in logical connection with the optical scanner may restrict access to that content in accordance with its predetermined configuration.

Subsequently, the method 600 ends 620. In alternative embodiments, the method 600 may include steps of printing 615 background color codes 302, code background 304, and/or badge background 208.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An security badge for securing a two-dimensional bar code, the security badge comprising:
   a printed QR Code encircled by a plurality of static color-coded rings, wherein each color-coded ring represents a predefined category selected from the group consisting of:
      a category representative of subject matter displayed on a website to which a URL referenced in the QR Code resolves, and a category representative of a Trademark class established by the United States Trademark Office.

2. The security badge of claim 1, wherein one or more of the color-coded rings overlap the QR Code.

3. The security badge of claim 2, wherein one or more of the color-coded rings underlap the QR Code.

4. The security badge of claim 1, wherein a color of an area encircled by the one or more color-coded rings is representative of a predefined category not represented by the one or more color-coded rings.

5. The security badge of claim 4, wherein the area encircled by the one or more color-coded rings is partially overlaid with the QR Code.

6. The security badge of claim 1, wherein the one or more color-coded circles overlap and underlap one another.

7. The security badge of claim 1, wherein the one or more color-coded circles comprise non-uniform radii.

8. The security badge of claim 1, wherein each of the one or more color-coded circles comprises non-uniformly located centers within the QR Code.

9. The security badge of claim 8, wherein the area encircled by the one or more color-coded rings is overlaid with the QR Code.

10. The security badge of claim 1, wherein the one or more color-coded rings are textured.

11. The security badge of claim 10, wherein the texture comprises Braille identifying the predefined category.

12. The security badge of claim 1, wherein the one or more color-coded rings are chemiluniscent.

13. The security badge of claim 1, wherein one of the one or more color-coded rings geometrically inscribe the data matrix of the QR Code.

14. The security badge of claim 1, wherein the QR Code comprises between one and four non-linear border edges, the non-linear border edges representative of one of: a date upon which the QR Code was printed, a location where the QR Code was printed, a target audience, and effectiveness estimate.

15. An security badge for securing a two-dimensional bar code, the security badge comprising:
   a printed QR Code encircled by a one or more color-coded rings, the one or more color-coded rings comprise rigid, tubular, three-dimensional rings affixed to the security badge and overlapping the printed QR Code, and wherein each color-coded ring represents a predefined category selected from the group consisting of:
      a category representative of subject matter displayed on a website to which a URL referenced in the QR Code resolves, and a category representative of a Trademark class established by the United States Trademark Office.

16. An security badge for securing a two-dimensional bar code, the security badge comprising:
   a plurality of printed stripes underlaying the QR Code and the one or more color-coded rings, wherein each of the printed stripes is representative of secondary category selected from the group consisting of: a category representative of subject matter displayed on a website to which a URL referenced in the QR Code resolves, and a category representative of a Trademark class established by the United States Trademark Office, a category representative of a type of real estate offering, and category representative of a price range, a category representative of an age range for which the website is intended, and a category representative of a geographic location; and
   a printed QR Code encircled by a plurality of color-coded rings, wherein each color-coded ring represents a predefined category selected from the group consisting of:
      a category representative of subject matter displayed on a website to which a URL referenced in the QR Code resolves, and a category representative of a Trademark class established by the United States Trademark Office.

17. The security badge of claim 16, further comprising a passive RFID tag for demodulating a radio-frequency signal, the RFID tag identifying the owner of the QR Code.

18. An security badge for securing a two-dimensional bar code, the security badge comprising:
   a printed bar code encircled by a plurality of static color-coded rings, wherein each each color-coded ring represents a predefined category selected from the group consisting of: a category representative of subject matter displayed on a website associated with the bar code, a geographic location of a business managing the bar code, and a category representative of a Trademark class established by the United States Trademark Office.

* * * * *